United States Patent
Dube

(10) Patent No.: US 9,634,295 B2
(45) Date of Patent: Apr. 25, 2017

(54) EXPANDABLE BATTERY PACK CONTAINMENT DEVICE FOR POUCH BATTERY CELLS

(75) Inventor: William P. Dube, Wheatridge, CO (US)

(73) Assignee: Pellion Technologies, Inc., Woburn, MA (US)

( * ) Notice: Subject to any disclaimer, the term of this patent is extended or adjusted under 35 U.S.C. 154(b) by 1929 days.

(21) Appl. No.: 12/688,566

(22) Filed: Jan. 15, 2010

(65) Prior Publication Data

US 2011/0177377 A1    Jul. 21, 2011

(51) Int. Cl.
   H01M 2/02      (2006.01)
   H01M 2/10      (2006.01)
   H01M 10/04     (2006.01)
   H01M 10/0525   (2010.01)

(52) U.S. Cl.
   CPC ....... H01M 2/0207 (2013.01); H01M 2/1061 (2013.01); H01M 2/1077 (2013.01); H01M 10/0481 (2013.01); *H01M 2/0275* (2013.01); *H01M 10/0525* (2013.01)

(58) Field of Classification Search
   CPC ...................................... H01M 2/02
   USPC ....................................... 429/153
   See application file for complete search history.

(56) References Cited

U.S. PATENT DOCUMENTS

| 3,607,440 A | 9/1971 | Fred |
| 6,296,967 B1 | 10/2001 | Jacobs et al. |
| 6,376,126 B1 | 4/2002 | Faust et al. |
| 6,669,826 B1 * | 12/2003 | Milgate et al. ............... 204/254 |
| 6,780,540 B2 | 8/2004 | Hoffman et al. |
| 7,060,116 B2 | 6/2006 | Marukawa et al. |
| 2007/0026304 A1 * | 2/2007 | Jeon et al. .................... 429/156 |
| 2009/0311597 A1 * | 12/2009 | Chiang et al. ................ 429/213 |

* cited by examiner

*Primary Examiner* — Jacob Marks
(74) *Attorney, Agent, or Firm* — Hogan Lovells US LLP

(57) ABSTRACT

A pouch battery cell container, including at least, one battery cell compartment, is interposed between two end plates. The planar electrode surfaces of a pouch battery cell, housed within the battery cell compartment, are subjected to a constant and optimal amount of compressive force during cell expansion and contraction for battery cell optimization. A first end plate and a second end plate are coupled together by a plurality of connecting devices, wherein each connecting device includes an elastic deformation component. As the battery cells housed within the battery container expand and/or contract, the first and second end plates move relative to each other while constrained by the elastic deformation device so as to maintain a constant amount of compressive force on the planar electrode surfaces housed within the battery cell.

12 Claims, 6 Drawing Sheets

EXPANDABLE BATTERY PACK CONTAINMENT DEVICE FOR POUCH BATTERY CELLS

BACKGROUND OF THE INVENTION

Field of the Invention

This invention relates to single cell and multiple cell foil packaged batteries and in particular to an expandable device for encasing a plurality of foil packaged batteries.

Relevant Background

Batteries come in many shapes and sizes. The most common type of battery is a cylindrical cell. Such a battery is easy to manufacture and offers a high energy density with good mechanical stability. The cylindrical cell, normally made of some type of metal, has the ability to withstand high internal pressure and is widely used in applications that do not demand an ultra-small size. Most cylindrical cells, however, are of a fixed size; thus the battery pack must be designed around established battery sizes.

Lithium ion batteries have generally been produced in cylindrical cells to provide a constant constraint and containment for the storage of electricity within a battery. Cylindrical cells have a limit to their capacity in amp hours. This limit greatly increases the number of cells needed to be attached together in order to provide large capacity storage of the lithium ion chemistry.

Button cells and prismatic cells were a natural progression of the cylindrical cell. However, button cells suffer from an inability to vent excess pressure that may exist in an overcharge situation and often require excessive time to recharge. Prismatic cells suffer from lower power density and higher manufacturing cost.

Pouch cells are the newest form of battery technology. In a pouch cell a flexible heat-sealable foil is used to enclose the battery components. Pouch cells can be made to exact design requirements therefore making efficient use of valuable space. With the absence of a metal enclosure the pack is significantly lighter. Pouch cells are used for lithium-based chemistries with a life cycle somewhat less than that of other battery designs.

When not constrained pouch cells expand and contract slightly with each charge and discharge cycle; and as the cell ages the pouch experiences a slight permanent expansion. For example, if a plurality of pouch cells is contained within a 10 inch region, by the time the pack of cells has experienced 1,000 cycles, 10.3 inches may be needed to house the same plurality of cells. To optimize performance and obtain maximum power density and cycle life, the electrodes within the pouches must be constrained under constant pressure. But, it is well known that non-flexible containment, or containment which causes internal cell pressure to increase during expansion, reduces cell performance. This reduction in performance is present when the cells are new and becomes more significant as the pouches age.

One pouch battery containment system known in the prior art uses neoprene or rubber material to surround the cells. Such a system is static, meaning that it can only provide the correct pressure on the pouch cells at one particular instance in the pouch's life cycle since as the cells age the containment system does not expand with the permanent expansion of the pouch cells. Thus the optimal capacity, performance and life cycle of the cells are curtailed.

A need therefore exists to contain pouch battery cells so as to place the electrodes within each pouch at a constant pressure during each charge/discharge cycle so as to optimize performance and life cycle. Because each pouch plastically deforms as it ages, a need also exists for a containment system that is adjustable to provide each pouch with constant pressure thereby optimizing performance over the pouch's entire life cycle. These and other improvements to the prior art are addressed by one or more embodiments of the present invention.

SUMMARY OF THE INVENTION

A system and method for housing one or more pouch battery cells is hereafter disclosed by way of example. According to one embodiment of the present invention, a battery cell container, including at least one battery cell compartment, is interposed between two end plates. A pouch battery cell, housed within the battery cell compartments, is held in a constant amount of compression during cell expansion and contraction so that the performance of the battery cell is optimized.

One aspect of the present invention includes two end plates, a first end plate and a second end plate, coupled together by a plurality of connecting devices, sandwiching one or more battery cells. Each connecting device includes an elastic deformation device. As the battery cells housed within the battery container expand and/or contract the first and second end plates move, as constrained by the elastic deformation device, relative to each other so as to maintain a constant amount of pressure on the battery cells housed therebetween.

According to another aspect of the present invention, the elastic deformation device includes a predefined limit. Upon reaching the limit the connecting device plastically deforms in response to further battery cell expansion. During the plastic deformation and subsequent expansion/contraction cycles, the amount of pressure exerted on the battery cells housed between the end plates remains constant.

A method for storage of pouch battery cells, according to another embodiment of the present invention, includes housing at least one pouch battery cell in a battery cell container wherein the battery cell container includes a first end plate and a second end plate. Each pouch battery cell includes at least one cell plate. The method continues by coupling the first end plate to the second end plate via a plurality of connecting devices thereby maintaining the cell plates of the at least one pouch battery under a constant amount of pressure. An elastic deformation device is incorporated in each connecting device. As the pouch cells expand and contract the elastic deformation device allows the first and second end plates to move relative to one another so as to maintain the cell plates under a constant amount of pressure. Upon reaching a predefined limit the connecting device plastically deforms all the while maintaining the cell plates under the same external pressure.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Batteries expand and contract. As a battery cell is charged it expands and as it discharges the cell contracts. During cycles, the battery plate thickness changes for three reasons—(i) expansion and contraction of host materials due to intercalation, (ii) electrode volume increase caused by irreversible reaction deposits, and (iii) dead volume and pressure changes within the cell case depending on battery structure and construction. Moreover the cycle of expansion and contraction is not entirely elastic. As a battery cell ages it permanently expands. Thus each cycle of expansion and contraction is slightly different than its predecessor.

Figure 1:
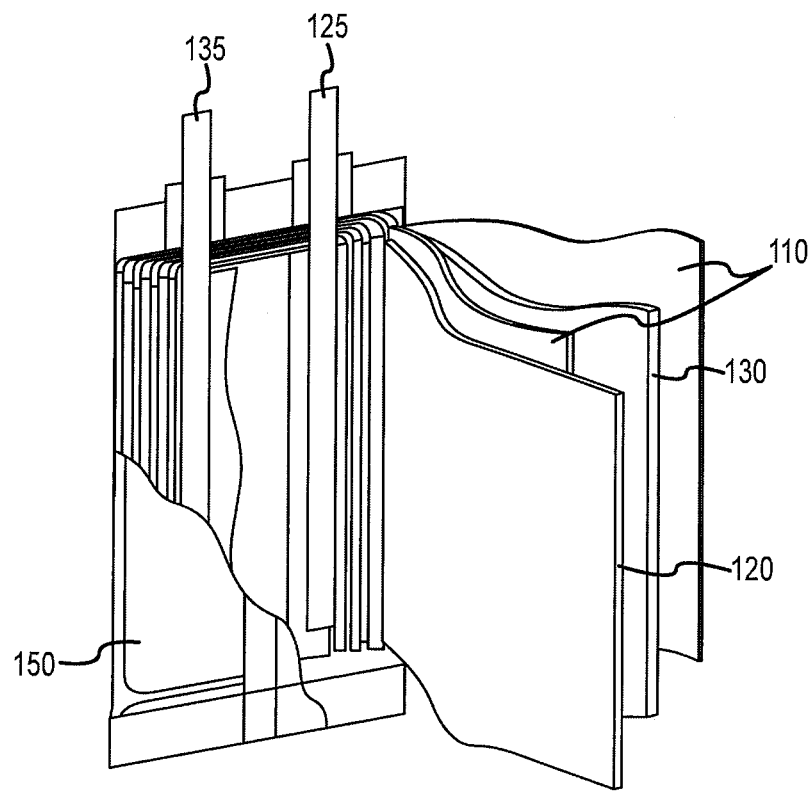
FIG. 1 is a cross section of a typical pouch battery as is known in the prior art.

A pouch type battery includes an electrode assembly and a pouch case surrounding and sealing the electrode assembly. As shown in FIG. 1 an electrode assembly is formed by interposing a separator between positive electrode 130 and negative electrode 120 plates, and stacking or winding the separator and the plates together. Electrode tabs 125, 135 are, respectively, welded to the negative 120 and positive 130 plates. The electrode tabs 125, 135 are assembled to project outside the pouch case 150 when the electrode assembly is received in the pouch case. As the battery is charged the plates expand or swell. After an initial charging, in which a permanent initial expansion takes place, the plates thereafter exhibit substantially elastic expansion and contraction. But, as the plates age with each charging and discharging cycle, the per cycle expansion slightly exceeds that of the contraction. This expansion can be on the order of 5-7% over the life of the cells meaning a one meter pack of pouch battery cells will expand 5-7 centimeters as the cells age. Overcharging, over-discharging, and under-charging may accelerate this deformation process.

It is also well know in the art that during the charging and discharging cycles a Lithium ion battery produces gas; as the gas is produced internal pressure of the pouch increases. As excessive pressure decreases performance and can lead to damage to the battery and surrounding structure, most batteries include some means by which to release excess pressure. Indeed many innovations have been presented to protect the battery components and infrastructure from explosive battery events ultimately caused by excessive internal pressure. Few however address the need to manage the internal pressure to maximize performance.

Just as excessive pressure is a concern with pouch batteries, so to is a lack of adequate internal pressure. A typical pouch battery has a life of several thousand cycles in which one cycle is the charging and discharging of the battery. Clearly an over pressurized environment will diminish the life and performance of a battery, but so too will an under pressurized environment. To achieve optimal performance including charge density and cycle life of a pouch battery, the battery plate electrodes, the anode and cathode, must be exposed continually to a constant amount of pressure.

In most batteries this pressure is exerted by the hard enclosing case. In such cells a tradeoff is made between optimal performance, which is based on a pressure exerted on the electrodes, and containment and/or control of resulting excess pressure as the plates expand and contract. Indeed prior art containment systems of pouch batteries set internal pressure on the electrodes below the optimal level so that as the pouches age and expand a point is reached where performance is optimized. But as the pouches continue to expand and pressure increases, performance again dwindles. Thus optimal performance of the battery pack only occurs at one fleeting instant.

According to one embodiment of the present invention, the battery cell plates, the anodes and cathodes of the battery, are placed under a constant force 260 normal to the planar surface of the cell plates so as to continually optimize performance. This constant compressive pressure is exerted on the pouch cell via a pouch cell containment device.

Figure 2:
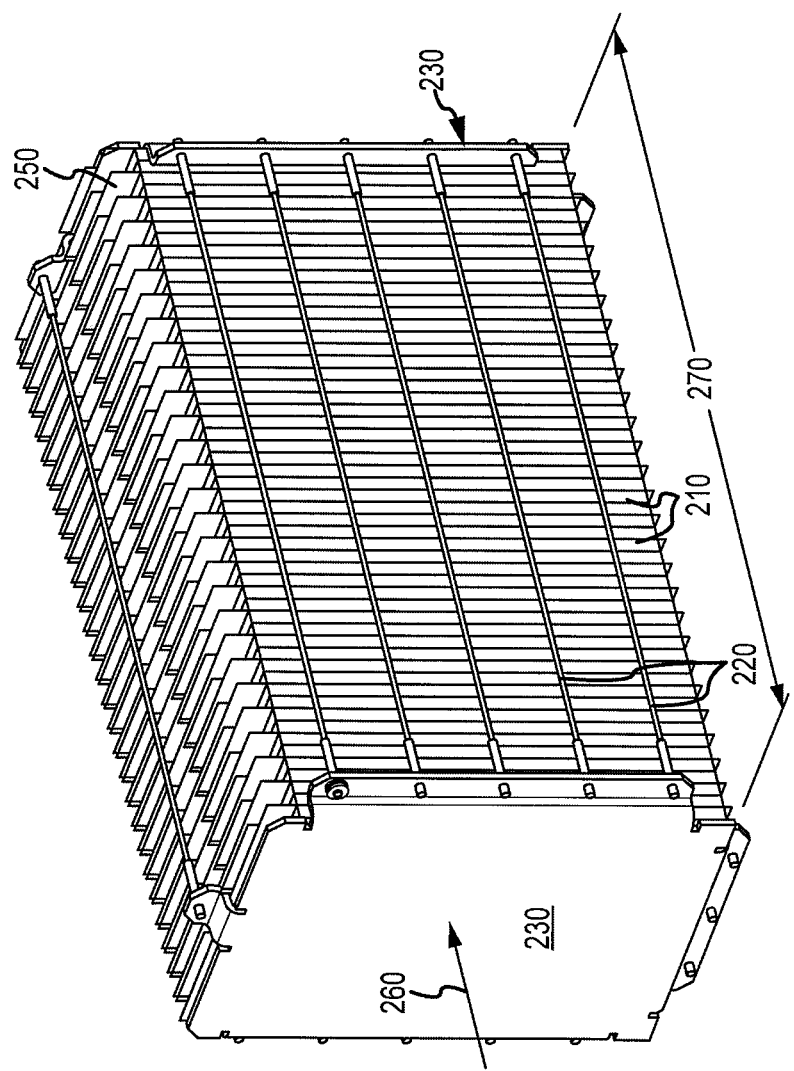
FIG. 2 is a perspective view of an expandable pouch battery containment device according to one embodiment of the present invention.

FIG. 2 is a perspective view of an expandable pouch battery containment device according to one embodiment of the present invention. The expandable pouch battery containment device includes a pair of end plates 230 coupled together by a plurality of connecting devices 220. Interposed between the two end plates 230 is a plurality of pouch battery cells 210 that are separated by a separator plate 250. The two end plates 230 are drawn together by the plurality of connecting devices 220 producing a normal compressive force 260 on the faces of each pouch battery cell 210.

The end plates 230 and separator plates 250 are orientated so as to be parallel with the planar surface of the positive 130 and negative 120 electrode plates housed within each pouch battery cell 210. The connecting devices 220 draw the two opposing end plates 230 together until the positive 130 and negative 120 electrodes of the pouch battery cells 210 are under optimal compression.

Figure 3:
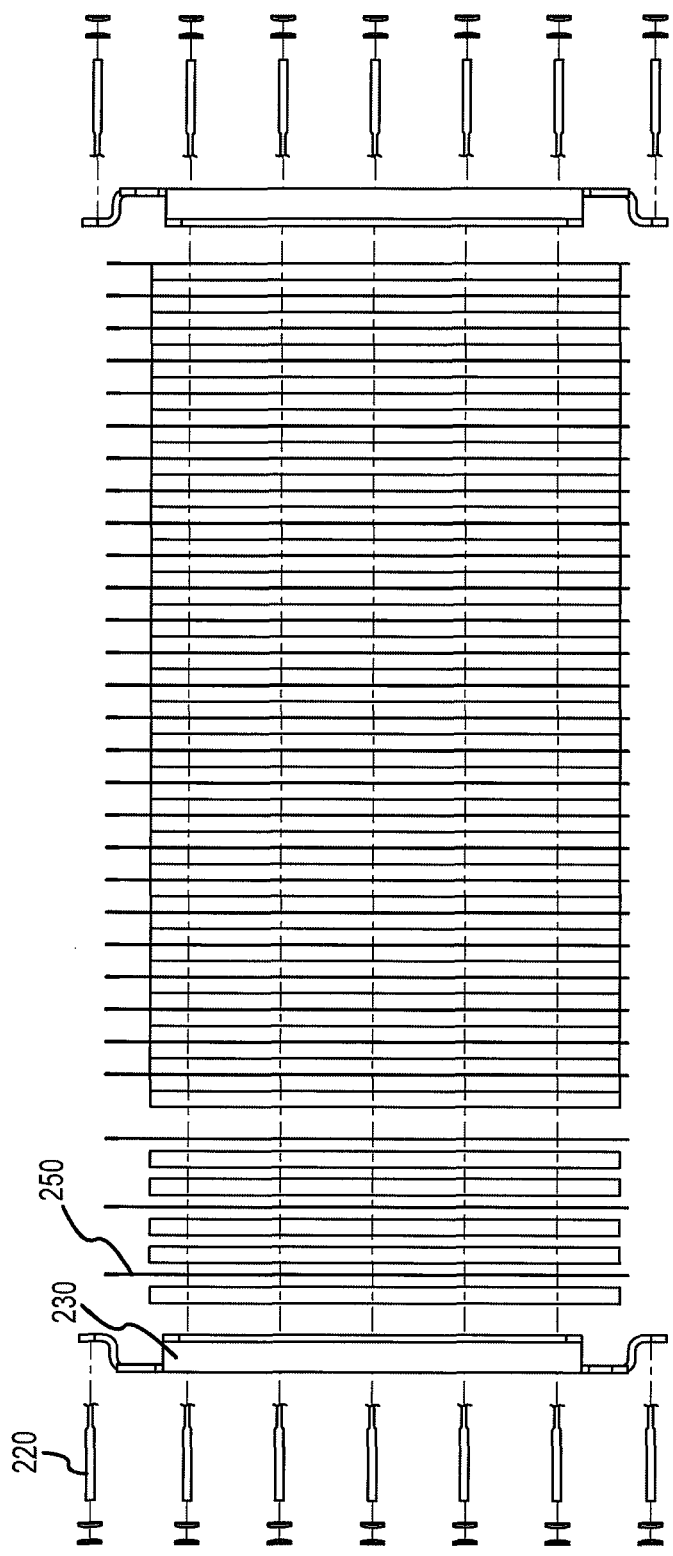
FIG. 3 is an exploded perspective view of the expandable pouch battery containment device of FIG. 1, according to one embodiment of the present invention.

FIG. 3 is an exploded perspective view of the expandable pouch battery containment device of FIG. 1. The exploded depiction of the containment device illustrates the ability of the end plates 230 to convey a uniform distributed force across the planar surface of each pouch battery cell 210. It can also be seen in FIG. 3 that the separator plates 250 and pouch battery cells 210 are not rigidly constrained. While the overall length 270 of the containment device is managed so as to maintain a constant amount of force 260 on each planar surface of each battery cell 210, each battery cell's expansion and contraction is not individually constrained. Rather, the plurality of battery cells 210 and the separator plates 250 are constrained as a unit.

As one skilled in the art can appreciate, each pouch battery cell may expand and contract differently. The design shown in FIGS. 2 and 3 demonstrates that while the overall unit of pouch cell batteries interposed between the two end plates is constrained, each battery pouch and separator plate is free to shift independently. Moreover the lateral sides, top and bottom edges of each pouch battery cell are unrestrained.

Figure 4:
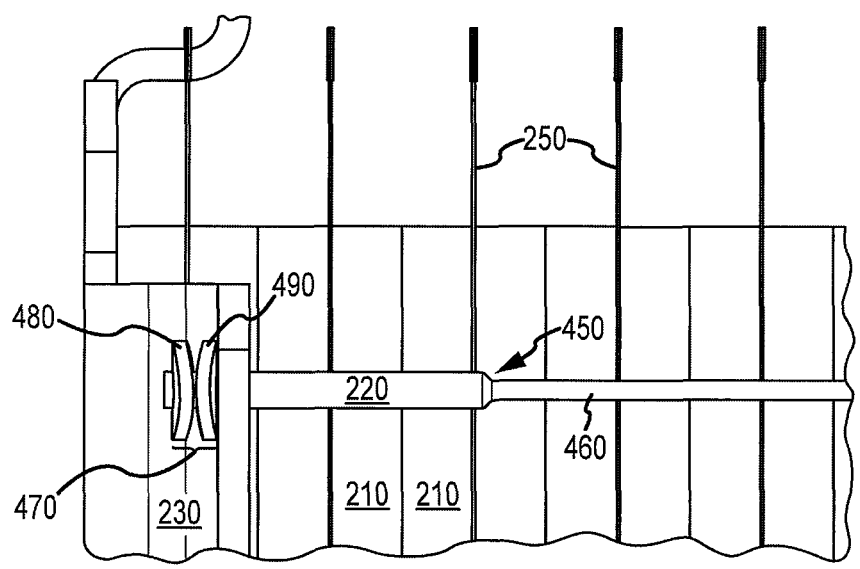
FIG. 4 is an enlarged side view of one end plate and connecting device of an expandable pouch battery containment device showing, according to one embodiment of the present invention, an elastic deformation device.

FIG. 4 is an enlarged side view of one end plate and connecting device of an expandable pouch battery containment device showing, according to one embodiment of the present invention, an elastic deformation device. As seen in FIGS. 2 and 3, the opposing end plates 230 are coupled together by a plurality of connecting devices 220. The expanded view of the single connecting device 220 shown in FIG. 4 is representative of all of the connecting devices of the expandable pouch battery containment device of the present invention.

According to one embodiment of the present invention, each connecting device 220 interfaces with each end plate 230 via an elastic deformation device 470. The embodiment shown in FIG. 4 shows a pair of opposing curvilinear components positioned around the connecting device. In this embodiment the connecting device includes a rod 220 of varying diameter passing through a void (hole) in the end plate 230 and secured via the elastic deformation device 470.

In operation a first curvilinear component 480 of the elastic deformation device 470 is affixed to the rod 220 and is directly opposed by a second curvilinear component 490. As the plurality of pouch battery cells expands, the compressive force between the pouch battery cells and the end plates increases. This increase of force is realized at the interaction of the end plate 230 and the first and second curvilinear components 480, 490 of the elastic deformation device 470. As more force is realized, curvilinear components 480, 490 elastically deform.

The curvilinear components 480, 490 are designed to provide a linear deformation over a predetermined range of force. As the curvilinear components 480, 490 deform, the force conveyed to the pouch battery cells remains constant. Said differently, the curvilinear components deform, expanding the size of the containment device so as maintain a constant compressive force between the end plates of the expandable pouch battery containment device.

As one skilled in the art will recognize the actual shape and type of material used for the two curvilinear components may vary. The shape and materials are selected such that an elastic and substantially constant force deformation of the components occurs up to a predetermined limit. Upon reaching the predetermined limit the rod or connecting device plastically deforms (as is described in more detail below) so as to maintain a substantially constant pressure on the pouch batteries while accommodating long term expansion of the battery pouches.

Figure 5:
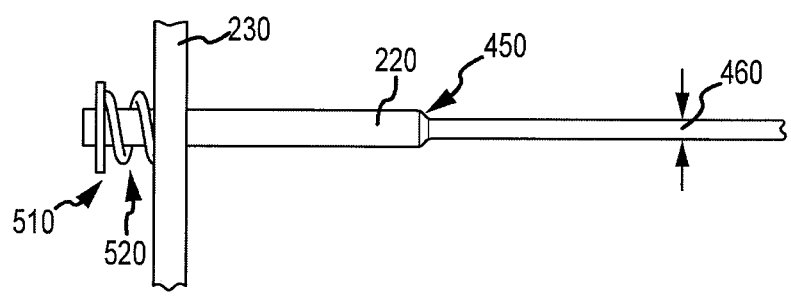
FIG. 5 is an enlarged side view of another embodiment of an elastic deformation device for an expandable pouch battery containment device according to the present invention.

According to another embodiment of the present invention the elastic deformation device utilizes a constant force spring. FIG. 5 is an enlarged side view of an elastic deformation device utilizing a constant force spring for an expandable pouch battery containment device according to the present invention. As before, two opposing end plates 230 are coupled together via a connecting device 220. At the interface between each end plate 230 and each connecting device 220, an elastic deformation device 470 absorbs the expansion and contraction of the pouch battery cells while maintaining a constant compression force. In this embodiment the elastic deformation device includes an end plate 510 affixed to the end of the connecting device 220 and a constant force spring 520. As the pouch battery cells expand the battery cell containment device also expands by way of the end plate 230 translating over the connecting device 220. The constant force spring 520 compresses as the battery cells expand but does so by rendering a substantial constant resistive force.

As is well known, a spring is an elastic object used to store mechanical energy. Springs are usually made out of hardened steel. Most springs (not stretched or compressed beyond the elastic limit) obey Hooke's law, which states that the force with which the spring pushes back is linearly proportional to the distance from its equilibrium length. Coil springs and other common springs typically obey Hooke's law. However, not all springs do. Springs based on beam bending can, for example, produce forces that vary nonlinearly with displacement and there are also linear springs which do not follow Hooke's law, sometimes called a negator spring that provides a constant force.

It is this latter type of spring that is contemplated by the present invention, a constant-force spring for which the force it exerts over its range of motion is a constant. That is, the spring contemplated here does not obey Hooke's law. Generally constant-force springs are constructed as a rolled ribbon of spring steel such that the spring is relaxed when it is fully rolled up. As it is unrolled, the restoring force comes primarily from the portion of the ribbon near the roll. Because the geometry of that region remains nearly constant as the spring unrolls, the resulting force is nearly constant.

The curvilinear components shown in FIG. 4 and the spring shown in FIG. 5 each deform so as to produce substantially a constant force over the range of deformation. However the range of elastic deformation varies from cycle to cycle. According to one embodiment of the present invention, the elastic deformation device 470 possesses a large enough range over which constant force deformation occurs regardless of the age of the battery pouches. According to another embodiment of the present invention the range of elastic deformation has a predetermined limit. Upon reaching the upper limit of that range, and as the pouches continue to expand, the tensile force in the connecting devices will rise until each connecting device plastically deforms.

As previously discussed, the expansion and contraction cycles of the pouch batteries are not entirely elastic. As the batteries age the planar width of each battery in both its charged and discharged state grows. Thus over time, to maintain a constant compressive force on the electrode plates within each pouch battery, the container must expand and contract with each cycle but also, according to one embodiment of the present invention, permanently elongate so that the range of the elastic deformation device remains operable for each charging/discharging cycle.

According to one embodiment of the present invention, as the battery pouches age and thus irreversibly expand, the length of the connecting devices (and thus the expandable pouch battery cell containment device itself) irreversibly lengthens. Because the plurality of pouch battery cells expands irreversibly over each cell's life cycle, a point will be reached upon which the expansion that occurs during charging will fully deform the elastic deformation device. As the battery cells continue to expand on subsequent cycles the elastic deformation device will no longer provide a constant force on the planar surfaces of the electrodes. Indeed pressure on the electrodes would continue to rise and, as the batteries discharge, fall until the elastic deformation device can once again insure a constant compressive force.

To maintain a constant pressure on the electrodes throughout the life of the pouch battery cells, the connecting device 220 is configured to plastically deform. In the embodiment of FIG. 4, the connecting device 220 is a rod having a circular cross section. The first portion 450 of the rod interfacing with the end plate 230 has a larger diameter than that of the center portion 460. As the entirety of the rod experiences the same axial tensile force, the stress over the smaller cross section is larger.

According to one embodiment of the present invention, the center portion 460 of the rod can be considered a prismatic bar experiencing a uniform tension. As the stress rises the bar will first elastically deform and then yield and enter into a range of plastic deformation. During the range of plastic deformation the bar will permanently lengthen while maintaining a substantially constant amount of stress. This constant amount of stress results in a constant amount of force exerted on the electrode plates. As one skilled in the relevant art will recognize, the stress/strain relationship of a prismatic bar varies greatly from one material to another. However, knowing the desired force by which the electrode plates are to be compressed and the yield strength and plastic deformation characteristics of a variety of material, a rod of certain composition can be dimensioned so that it will yield and plastically deform over a certain range and under a constant force.

When the pouch battery cells cease to expand, the elongation of the rod will remain thus providing a shift in the range over which the elastic deformation device can provide constant force deformation. By coupling the concepts of the elastic deformation device with that of permanent deformation in the connecting devices, the pouch battery cell containment device can expand to meet the growing dimensions of the plurality of battery pouches while maintaining a state where the electrodes are under a constant planar compressive force.

According to another embodiment of the present invention, the elastic deformation device utilizes a standard spring construction in which the compressive force increases as deflection (expansion) increases. The spring constant and range of the deflection, however, are managed so that each cyclical expansion of the pouch battery cells maximizes the elastic deformation device and thereafter causes plastic deformation of the connecting devices. The yielding connecting devices thus act to shift the elastic deformation range as the cells age. In instances in which the per cycle expansion is small but by comparison the overall expansion is large, the present invention allows for minimal variations in pressure per cycle supplemented by the expansion of the containment device over time.

For example assume that the optimal plate pressure for each cell is 15 psi and during each cycle a meter long battery pack will expand 0.0015 meters of which 0.0005 meters is permanent. That means after 100 cycles the pack which started out 1 meter in length will be 1.05 meters in length. During cycle 101 the pack will expand in length from 1.05 to 1.0515 and then contract to 1.0505. According to one embodiment of the present invention, the elastic deformation device has a deformation range of 0.001 meter. At any deformation larger than 0.001 meter the elastic deformation device no longer deforms causing the connecting device to plastically deform, in this case 0.0005 meters. Thus during cycle 102 the pack begins at length 1.0505, expands to 1.0520 and contracts to 1.0510. In this embodiment, during the elastic deformation of 0.001 meter the force is not perfectly constant but the change in force may only vary from 14.5 psi to 15.5 psi. The small variation in force has minimal impact on performance of the battery cell; and by using a conventional spring instead of a constant force spring, manufacturing cost and complexity can be significantly reduced.

Figure 6:
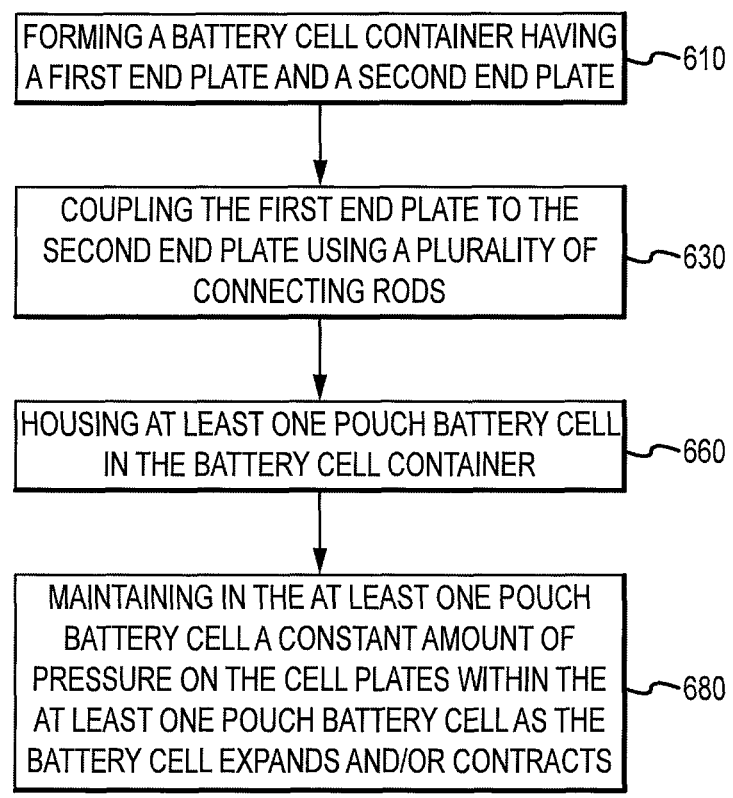
FIG. 6 is a flowchart of one method embodiment for housing at least one pouch battery cell under a constant amount of pressure according to the present invention.

FIG. 6 is a flowchart of one method embodiment for housing at least one pouch battery cell under a constant amount of pressure according to the present invention. In the following description, it will be understood that each block of the flowchart illustration, and combinations of blocks in the flowchart illustration, is a function that can be implemented by a variety of means. Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware that perform the specified functions or steps, or combinations of steps.

As shown in FIG. 6, a pouch battery cell container is formed 610 having a first end plate and a second end plate. The first end plate is thereafter coupled 630 to the second end plate using a plurality of connecting rods. Housed 660 in-between the first end plate and the second end plate is one or more pouch battery cells. In the instance that there is more than one pouch battery cell interposed between the first end plate and the second end plate, a separator plate can be placed in between each pouch battery cell.

The interface between each connecting rod and the first and second end plate includes at least one elastic deformation device. The elastic deformation device, according to one embodiment of the present invention, maintains 680 each pouch battery cell under a state of constant pressure with respect to the planar electrode faces of the pouch battery. As the battery expands and contracts the elastic deformation device enables the first end plate to move relative to the second end plate so as to expand the pouch battery cell containment device. The expansion of the containment device occurs while the planar surface of each pouch battery cell contained therein is under a constant amount of pressure.

Embodiments of the present invention describe a containment device, system and method for optimizing pouch battery cell performance. Pouch battery cells do not possess a rigid external case. As the electrodes within the pouch battery cell charge and discharge they expand and contract, respectively. Performance of pouch battery cells, however, can be optimized if the planar surface of the electrodes within the battery can be placed under a constant amount of pressure. Embodiments of the present invention house one or more pouch battery cells under an optimized amount of compressive force. By placing the electrodes under an optimal compressive force the life cycle, power density and other characteristics of the pouch battery cells are optimized.

The present invention enables each pouch battery cell to expand and contract throughout its life cycle by incorporating coupling two opposing end plates, which include an elastic deformation device, and interposing the battery cells therebetween. As the battery cells expand the elastic deformation device deforms allowing the dimensions of the containment device to change while maintaining the planar surfaces of the batteries under a constant force.

While there have been described above the principles of the present invention in conjunction with an expandable pouch battery cell containment device, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A system for housing a plurality of pouch cell batteries, the system comprising:
    a battery cell container including at least one cell compartment interposed between a first end plate and a second end plate;
    a pouch battery cell housed within the at least one cell compartment wherein the pouch battery cell has one or more cell plates aligned with the first end plate and second end plate and wherein the first end plate is connected to the second end plate by a plurality of tension rod assemblies, each having at least one surrounding elastic deformation device medial of a distal end thereof operable to elastically deform to a prescribed limit so as to place the one or more cell plates of the pouch battery cell in a constant amount of compression, and wherein each of the plurality of tension rod assemblies includes a tension rod dimension so as to plastically deform upon the elastic deformation device elastically deforming to the prescribed limit.

2. The system of claim 1 wherein said elastic deformation device is operable to elastically deform to said prescribed limit upon pouch cell expansion and/or contraction.

3. The system of claim 1 wherein the pouch battery cell is a Lithium ion pouch battery cell.

4. A pouch battery cell containment device comprising:
    a first end plate;
    a second end plate;
    at least one pouch battery cell compartment interposed between the first end plate and the second end plate wherein each pouch battery cell compartment is configured to house at least one pouch battery cell, the at least one pouch battery cell including one or more cell plates; and
    a plurality of tension rod assemblies, each having at least one surrounding elastic deformation device medial of a distal end thereof operable to elastically deform to a prescribed limit coupling the first end plate to the second end plate wherein each tension rod assembly is configured to constrain the at least one pouch battery cell compartment such that pressure on the one or more cell plates of the at least one pouch battery cell remains substantially constant as the at least one pouch battery cell expands and/or contracts, and wherein each of the plurality of tension rod assemblies includes a tension rod dimension so as to plastically deform upon the elastic deformation device elastically deforming to the prescribed limit.

5. The pouch battery cell containment device of claim 4 wherein said elastic deformation device is operable to elastically deform an elastic deformation amount so as to allow movement of the first end plate relative to the second end plate as the at least one pouch battery cell expands and/or contracts.

6. The pouch battery cell containment device of claim 4 wherein the at least one pouch battery cell is a Lithium ion pouch battery cell.

7. The system of claim 1 wherein said elastic deformation device comprises at least one curvilinear component.

8. The system of claim 7 wherein said elastic deformation device comprises a pair of opposed curvilinear components.

9. The system of claim 1 wherein said elastic deformation device comprises a spring.

10. The pouch battery cell containment device of claim 4 wherein said elastic deformation device comprises at least one curvilinear component.

11. The pouch battery cell containment device of claim 10 wherein said elastic deformation device comprises a pair of opposed curvilinear components.

12. The pouch battery cell containment device of claim 4 wherein said elastic deformation device comprises a spring.

* * * * *